Mar. 20, 1923.

F. E. LINDBLOOM 1,449,010

AIR VALVE LEAKAGE DETECTOR FOR PNEUMATIC TUBES

Filed Jan. 19. 1921

Inventor
F. E. Lindbloom
by Carl A. Crawford
Attorney

Patented Mar. 20, 1923.

1,449,010

UNITED STATES PATENT OFFICE.

FRANK E. LINDBLOOM, OF TACOMA, WASHINGTON.

AIR-VALVE-LEAKAGE DETECTOR FOR PNEUMATIC TUBES.

Application filed January 19, 1921. Serial No. 438,388.

*To all whom it may concern:*

Be it known that I, FRANK E. LINDBLOOM, a citizen of the United States, residing at Tacoma, in the county of Pierce and State of Washington, have invented new and useful Improvements in Air-Valve-Leakage Detectors for Pneumatic Tubes, of which the following is a specification.

The object of this invention is to provide a device for detecting leakage of inner tube air-valve stems.

As is well known, the tiny valve closures in these valve stems readily become worn, which is one cause of leakage, and they frequently become disalined or are prevented from seating by some minute particle interposed between the closure and its seat. These are only a few of the various causes some of which result in an easily perceptible leakage while others cause a slow and substantially imperceptible leakage which is almost impossible to detect and yet which in a short time, would necessitate inflation of the tube. Obviously it is a very easy matter to detect a perceptible leakage but by analogy it is just as difficult to detect a minute leakage although the latter is just as important to correct as the former.

Now it is the object of my invention to provide a device enabling the motorist to readily and accurately determine whether or not the valve stems leak, however slight the leak may be, and to this end, my invention is embodied in a temporary attachable device containing a means which is movable responsive to the slightest leakage and which is wholly unrestrained against movement responsive to leakage pressure.

My invention is provided with means for relatively prolonged and substantially air tight connection with the air valve so that if leakage is extremely minute there will be provided a chamber in which the gentle pressure can accumulate until sufficient to actuate the detecting portion of my device.

The invention will be more fully described in connection with the accompanying drawing and will be more particularly pointed out in and by the appended claims.

In the drawing:—

Like characters of reference designate similar parts throughout the different figures of the drawing.

Figure 1:
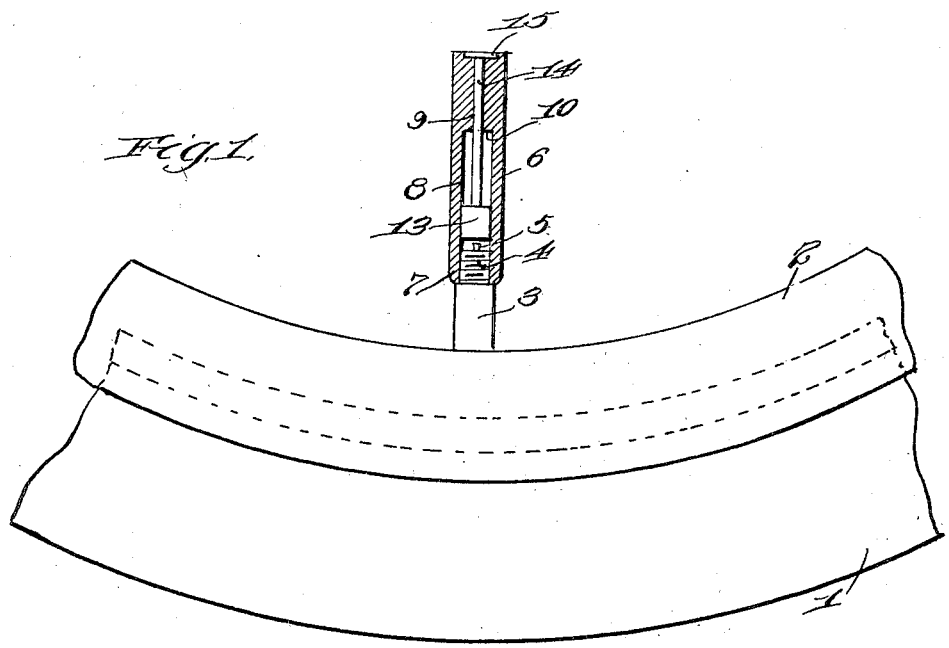
Figure 1 is a view in side elevation of a segment portion of a pneumatic tire and rim showing the device of my invention applied to the valve stem, the said device being in section and being in a position prior to leakage actuation.

As shown, 1 designates the shoe or casing of a pneumatic tire which is mounted upon a rim 2. The usual inner tube (not shown) is provided with the usual valve stem tube 3 projecting through the rim 2 and having a reduced and exteriorly threaded portion 4 for the usual cap. A portion of the valve stem 5 is shown projecting beyond the threaded portion 4, although in some constructions this stem does not so project. The presence of excessive or abnormal leakage is readily perceptible after the air supply nozzle has been removed from the end of the valve stem 3. Sometimes such leakage can be arrested by slightly moving the valve downwardly and then releasing it for seating movement against or under its spring action. However, under some conditions, the leakage is so minute and slight that it is imperceptible to the senses and in this event, the device of my invention, which I will now specifically describe, performs a highly useful function.

In the form shown, my invention takes the form of a piston sleeve 6 which is provided with means for prolonged and air tight engagement with the valve stem, and as shown, this feature is embodied in an open ended internally threaded portion 7, adapted to be turned onto threaded portion 4. I preferably make this sleeve of hard rubber although a sufficiently air tight connection could be obtained if the sleeve were of metal. However, it is my desire to avoid the use of gaskets, and in view of the fact that such pressure as I deal with is of a very gentle and low gauged nature, a substantially air tight connection can be made with the number of threads usually present on a valve stem. The sleeve 6 has a cylindrical bore 8 which extends from the open end 7, throughout a portion of the length of the sleeve. Throughout the remaining length of the sleeve is a piston rod bore 9, of reduced diameter with respect to the piston bore 8, a shoulder 10 resulting from this construction. The piston bore 9 terminates in a recessed end 11, in one end of the sleeve.

Figure 3:
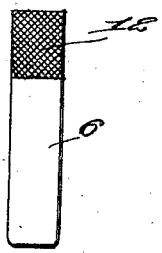
Figure 3 is a view in elevation of my device detached from the valve stem.

I will refer, hereinafter, to the open end 7, as the lower end of the sleeve, the remaining end being the upper end. Near the upper end, the periphery of the sleeve may be knurled or roughened as indicated at 12, to facilitate a proper finger grip in turning the sleeve onto and off from the stem 3, although this is not an essential feature. Otherwise, as will be seen by reference to Figure 3, the exterior of the sleeve is on longitudinally straight lines and is cylindrical with one diameter throughout its length, to simplify and reduce the cost of construction.

Figure 2:
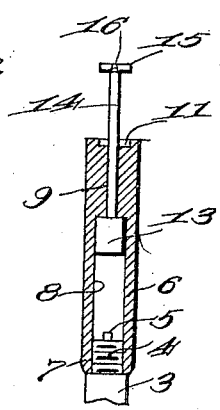
Figure 2 is a similar view showing the device in a position after leakage pressure has actuated the same.

A piston 13 is reciprocable in the boring and fits the same with a sufficiently tight working clearance such as would prevent air leakage of a very gentle pressure, the piston working much more freely than would be necessary under any considerable pressure. Fixed to the piston 13 is a piston rod 14 extending through bore 9. In order to relieve the piston 13 of any counteracting back pressure, the rod 14 will fit quite loosely in the bore 9. A head 15 is detachably connected with the piston rod 14, the same being shown threaded thereon, as indicated at 16. By means of this construction, the piston may first be inserted into the sleeve with the rod projecting as shown in Figure 2, and then the head 15, when attached, will prevent the piston from being withdrawn from the sleeve or lost. Furthermore, I desirably proportion the head 15 so that it will seat in the recess 11 flush with the upper end of sleeve 6. The parts are so proportioned that when the head 15 is forced downwardly to the limit of its travel, as shown in Figure 1, the user will know that the piston 13 is in the proper position. In other words, it is desired to have the piston 13 initially positioned as closely as possible to the valve stem without being in actual contact therewith.

After the user has inflated his tube and has given the valve stem the usual inspection to detect leakage, then as an added precaution he will turn the sleeve 6 onto the threaded end 4 tightly and push the piston 13 downwardly to the position shown in Figure 1. After a short time, if there is any leakage, pressure will accumulate under piston 13 and the latter will be raised or longitudinally moved in the sleeve 6, and however slightly the piston is moved, projection of the rod 14 and head 15 above the end of the sleeve 6 will indicate a minute and slow leakage.

It is desired to at this time assert one of the features of this invention which is that the piston 13 is wholly unrestrained against movement longitudinally in either direction, more important, in an upward direction responsive to air leakage. This differentiates the present device, broadly, from alarm devices and pressure testers.

If during a tour a tire is deflated and a leak in the tube cannot be detected, the device of my invention performs the useful function in detecting valve leakage. In other words, my invention is distinctly an attachment for temporary use and is essentially not a permanent fixture.

It is believed that the device of my invention will be clearly understood from the foregoing description, and I do not wish to be limited thereto except for such limitations as the claims may import.

I claim:—

1. In an air leak detector for inner tube valves of pneumatic tires, a piston sleeve having an open internally threaded end adapted to be turned onto the exteriorly threaded end of the valve stem and provided with a cylindrical piston bore extending throughout a portion of the length of said sleeve, and said sleeve having a reduced piston rod bore opening to said piston bore and extending throughout the remainder of the length of said sleeve and the end of said sleeve being recessed, a piston in said piston bore un-restrained against movement in either direction and having a piston rod extending through said piston bore and provided with a head adapted to seat in said recess with the top of said head flush with the top of said sleeve, the parts being proportioned to dispose said piston close to but free from contact with said valve stem when said head is seated in said recess whereby normally imperceptible and slow leakage will longitudinally move said un-restrained piston in one direction and project said head from said recess to exteriorly indicate the presence of leakage.

2. In a leak detector for inner tube valves of pneumatic tires, a tubular member having a threaded end for air tight connection with the air valve, and freely movable piston in said member adapted for actuation in one direction by normally imperceptible and slow leakage from said valve and having a portion adapted to preject from said member to indicate such leakage.

In testimony that I claim the foregoing as my own, I hereby affix my signature.

FRANK E. LINDBLOOM.